United States Patent
Zhou et al.

(10) Patent No.: US 10,010,862 B2
(45) Date of Patent: Jul. 3, 2018

(54) HYDROPHILIC MAGNETIC RESIN WITH HIGH SPECIFIC AREA, PREPARATION METHOD THEREFOR AND APPLICATION METHOD THEREOF FOR RAPIDLY EXTRACTING PHTHALATES IN WATER BODY

(71) Applicants: Nanjing University, Nanjing (CN); Nanjing University & Yancheng Academy of Environmental Protection Technology and Engineering, Yancheng (CN)

(72) Inventors: Qing Zhou, Nanjing (CN); Mancheng Zhang, Nanjing (CN); Aimin Li, Nanjing (CN); Chendong Shuang, Nanjing (CN); Mengqiao Wang, Nanjing (CN); Wei Wang, Yancheng (CN); Congjian Huang, Nanjing (CN); Jingyi Jiang, Yancheng (CN); Haibo Li, Nanjing (CN)

(73) Assignees: NANJING UNIVERSITY, Nanjing (CN); Nanjing University & Yancheng Academy of Environmental Protection Technology and Engineering, Yancheng (CN)

( * ) Notice: Subject to any disclaimer, the term of this patent is extended or adjusted under 35 U.S.C. 154(b) by 211 days.

(21) Appl. No.: 14/913,898

(22) PCT Filed: Aug. 21, 2014

(86) PCT No.: PCT/CN2014/084886
§ 371 (c)(1),
(2) Date: Feb. 23, 2016

(87) PCT Pub. No.: WO2015/024520
PCT Pub. Date: Feb. 26, 2015

(65) Prior Publication Data
US 2016/0220982 A1 Aug. 4, 2016

(30) Foreign Application Priority Data
Aug. 23, 2013 (CN) .......................... 2013 1 0374104

(51) Int. Cl.
| | |
|---|---|
| B01J 20/28 | (2006.01) |
| C02F 1/28 | (2006.01) |
| B01J 20/30 | (2006.01) |
| C02F 1/48 | (2006.01) |
| B01J 20/26 | (2006.01) |
| B01J 20/22 | (2006.01) |
| C08F 212/36 | (2006.01) |
| C08F 2/44 | (2006.01) |
| C02F 101/32 | (2006.01) |
| C02F 101/30 | (2006.01) |

(52) U.S. Cl.
CPC ....... *B01J 20/28009* (2013.01); *B01J 20/223* (2013.01); *B01J 20/267* (2013.01); *B01J 20/3071* (2013.01); *C02F 1/285* (2013.01); *C02F 1/288* (2013.01); *C02F 1/48* (2013.01); *C08F 2/44* (2013.01); *C08F 212/36* (2013.01); *C02F 2101/305* (2013.01); *C02F 2101/32* (2013.01)

(58) Field of Classification Search
CPC ................ B01J 20/28009; B01J 20/267; B01J 20/3071; C02F 1/288; C02F 1/285; C02F 2101/32; C02F 2101/305; C08F 212/36; C08F 2/44; C08F 218/10; C08F 2220/286
See application file for complete search history.

(56) References Cited

U.S. PATENT DOCUMENTS

| | | | | |
|---|---|---|---|---|
| 2004/0178148 A1* | 9/2004 | Guter | ........................ | C02F 1/42 210/670 |
| 2009/0253220 A1* | 10/2009 | Banerjee | ................ | B01D 15/00 436/523 |
| 2011/0089118 A1* | 4/2011 | Usuki | ................ | C12N 15/1006 210/714 |
| 2012/0177707 A1* | 7/2012 | Matsushita | ............... | A61K 8/11 424/401 |
| 2013/0053460 A1* | 2/2013 | Harris | ...................... | B01J 39/18 521/38 |
| 2016/0272745 A1* | 9/2016 | Daniel | .................... | C08F 6/005 |
| 2017/0320983 A1* | 11/2017 | Daniel | .................... | A61L 15/22 |

FOREIGN PATENT DOCUMENTS

GB 2060430 A * 5/1981 ............. B01J 49/00

* cited by examiner

*Primary Examiner* — Christopher Hixson

(57) ABSTRACT

Implementations herein relate to a method for extraction of phthalates using hydrophilic magnetic resins with high specific surface areas. The implementations relate to a technical field of preparation of resins for fast enrichment and separation of trace organics in water. By adding magnetic particles, precursor resins may be prepared using divinylbenzene, vinyl benzoate and glycidyl methacrylate copolymerization ester. After the cross-linking reaction, surface areas of the resins are increased and hydrolysis of the ester group in alkaline solution may be implemented to obtain high specific surface magnetic resins rich in hydroxyl groups. The resins have higher adsorptive capacity and selectivity to adsorb phthalates in water samples. Rapid extraction may be implemented using magnetic solid phase extraction rod to achieve enrichment and separation of phthalates in a large amount of water samples.

10 Claims, 4 Drawing Sheets

HYDROPHILIC MAGNETIC RESIN WITH HIGH SPECIFIC AREA, PREPARATION METHOD THEREFOR AND APPLICATION METHOD THEREOF FOR RAPIDLY EXTRACTING PHTHALATES IN WATER BODY

CROSS REFERENCE TO RELATED APPLICATION

This application is a national stage application of International application number PCT/CN2014/084886, filed Aug. 21, 2014 titled "Hydrophilic magnetic resin with high specific area, preparation method therefor and application method thereof for rapidly extracting phthalates in water body," which claims the priority benefit of Chinese Patent Application No. 201310374104.4, filed on Aug. 23, 2013, which is hereby incorporated by reference in its entirety.

TECHNICAL FIELD

Implementations herein relate to a technical field of preparation of resins for fast enrichment and separation of trace organics in water, and particularly to a method for extraction of phthalates using hydrophilic magnetic resins with high specific surface areas.

BACKGROUND

Phthalate, also known as phthalate, is widely used in daily life products in the environment. Studies have shown that phthalates can interfere with endocrine, reduce male sperm count, exercise capacity, cause abnormal shapes, and lead to serious death azoospermia and testicular cancer. Currently, the substance has been identified as a kind of typical endocrine disruptors, and its presence in the environment and migration transformation process have to be strictly monitored. It is difficult to enrich and separate trace amounts of phthalates for further analysis in complex water environments. Especially during the collection, storage, transport, processing of the sample, it is hard to avoid being in contact with the same type of materials. Therefore, a method for enrichment and separation of phthalates for further analysis is needed.

Solid phase extraction has been widely used to analyze micro organics in water. However, conventional solid phase extraction techniques have problems such as time-consuming for sample enrichment and separation, high possibility of cylinder plug, and high costs. To solve the problems, researchers have introduced magnetic particles to the solid phase extraction. For example, extract columns have been replaced by full-mixing type agitation and enrichment in water. Magnets may be used to collect materials filled for solid phase extraction and therefor provide fast and efficient solid phase extractions of a large volume of trace amounts of substances. Phthalates in water body may be enriched using the magnetic solid phase extraction and then collected for further analysis. This magnetic solid phase extraction avoids cumbersome processes of sample collection, transport, and interference due to other sample materials. This magnetic solid phase extraction also effectively improves accuracy of analysis.

Magnetic resin materials, such as those described in CN 102049243A and CN 102516679A, are magnetic high specific surface area hypercrosslinked resins. These resins have good capability of adsorption and desorption, indicating their applicability for extraction of substances such as phthalates. But these resin materials include styrene-divinylbenzene hydrophobic backbones, and hydrophilic groups are not modified. Therefore, they have to be activated before extraction. Further, their extraction of micro organic pollution in water mainly relies on hydrophobic interactions, which have poor selectivity and low anti-jamming capability. This results in ineffective extraction of target substances.

SUMMARY

1. Problems. Under conventional techniques, phthalates are difficult to be detected. Implementations herein relate to a method for extraction of phthalates using hydrophilic magnetic resins with high specific surface areas. The implementations provide hydrophilic magnetic resins with high specific surface areas. For example, surfaces of the resins are modified by hydroxyl groups such that interactions between phthalates in water and hydrogen bonds enhances selectivity with respect to target substances. The implementations establish a rapid and efficient extraction method based on magnetic solid phase extraction for extracting trace amounts of phthalates.

2. Solutions. To solve the problems above, the implementations provides a method for preparation of hydrophilic magnetic resins with high specific surface areas. The implementations may include the following operations.

(a) Providing a water phase by adding 0.5 to 2% by weight of gelatin and 5 to 20% by weight of salt to the water phase.

(b) Providing an oil phase by mixing monomer reactants and toluene as a porogenic agent, adding benzoyl peroxide as an initiator, and uniformly mixing thereof.

(c) Adding magnetic particles wrapped and modified by oleic acid to the oil phase, uniformly mixing thereof, adding the oil phase into the water phase, and obtaining magnetic white balls after a cooling process, a filtering process, a washing process, and a drying process. In these instances, a weight ratio between an amount of the water phase and an amount of the oil phase is about 2.5 to 9.5:1, a stirring speed is about 100 to 400 rpm, and a temperature is control at about 60 to 80° C. for 3 to 6 hours and at about 80 to 90° C. for 5 to 8 hours.

(d) Swelling the magnetic white balls in dichloroethane for about 6 to 9 hours, adding 20 to 60% weight of anhydrous ferric chloride as a catalyst with respect to a weight of the magnetic white balls, raising the temperature to 80° C., and keeping the temperature for about 9 to 12 hours to obtain resins.

(e) Washing and drying the resins obtained in step (d), dipping the resins into an aqueous sodium hydroxide solution, separating the resins using centrifuge after cooling, washing the resins using water, and drying the resins to obtain the hydrophilic magnetic resins with high specific surface areas.

In some implementations, the monomer reactants in step (b) may include divinyl benzene, vinyl benzoate and glycidyl methacrylate. In these instances, a weight ratio between an amount of vinyl benzoate and an amount of divinyl benzene is about 1:0.5 to 2, and a weight ratio between an amount of Methyl acrylate ester and the amount of divinylbenzene is about 1:1 to 9.

In some implementations, a weight ratio between an amount of the toluene and an amount of the monomer reactants is about 1 to 2:1, and a weight of Benzoyl peroxide is about 0.5 to 3% of a total weight of monomer reactants and the porogenic agent.

In some implementations, the magnetic particles in step (c) include $Fe_3O_4$, $\gamma$-$Fe_2O_3$, and stainless steel powder. In these instances, a weight of the magnetic particles is about 5 to 25% of a weight of monomer reactants.

In some implementations, a weight of the sodium hydroxide solution used in step (e) is 1 to 8 times of a weight of crosslinking magnetic resins, a concentration of the aqueous sodium hydroxide solution is about 5%, a reaction temperature is about 60 to 70° C., and a reaction time is about 5 hours.

Hydrophilic magnetic resins with high specific surface areas may include hydrophilic magnetic resins with high specific surface areas prepared using the method of implementations described above.

Extraction of phthalates may be implemented using hydrophilic magnetic resins with high specific surface areas prepared as described above. A method for extraction of phthalates using hydrophilic magnetic resins with high specific surface areas may include the following operations.

(1) Enrichment. Dispersing the hydrophilic magnetic resins with high specific surface areas prepared using the method of implementations described above to an environmental water sample, stirring the environmental water sample at a room temperature for about 10 to 60 min, applying a magnetic field to the environmental water sample, and separating extraction materials from the environmental water sample using the magnetic field. In these instances, a weight of the environment water sample is about 500 to 5000 times of a weight of the hydrophilic magnetic resins with high specific surface areas.

(2) Rinsing the extraction materials and drying, placing the magnetic material generated in step (1) into eluent, washing away impurities, and drying the extraction materials;

(3) Eluting. Mixing the dried extraction materials with ethyl acetate for about 5 to 10 min, separating the extraction materials from the elution solvent using the magnetic field, and obtaining supernatant and place the supernatant through 0.22 μm membrane to for analysis. In some instances, a weight ratio between a weight of ethyl acetate and a weight of the hydrophilic magnetic resins with high specific surface areas being 5 to 25.

(4) Detection and analysis. Detection and analysis on the elution solvent using HPLC may be performed.

In some implementations, the stirring the environmental water sample may include stirring the environmental water sample using a magnetic stirring bar associated with solid phase extraction. The magnetic stirring bar associated with solid phase extraction may include wire, a plastic handle, a casing, a switch and an electromagnet.

In some implementations, the eluent used in step (2) is a solution including methanol and water with a volume concentration of 1 to 10%, and a volume of the solution is about 1% of a volume of the environmental water sample.

In some implementations, a condition associated with the detection and analysis on the elution solvent using the HPLC as described in step (4) is provided below: C18 column, namely 4.6×250 mm, 5 μm, mobile phase flow rate of 1 mL/min, column temperature 30° C., detection wavelength 220 nm; mobile phase of acetonitrile-water, and gradient acetonitrile phase is: 0 to 8 min, 60 to 80%; 8 to 15 min, 80 to 90%; 15 to 16 min, 90 to 100%; 16 to 27 min, 100%; 27 to 30 min, 60%.

3. Beneficial effects. Compared to conventional techniques, the beneficial effects of the implementations are as follows.

(1) The implementations provide a method for preparation of hydrophilic magnetic resins with high specific surface areas. The implementations add a hydrophilic monomer in the polymerization process and therefore improve hydrophilicity of resin skeletons. On this basis, the resins contain a large number of hydroxyl groups by the hydrolysis reaction of the resin. In addition to the hydrophobic interactions of the resin, the resins have higher adsorptive capacity and selectivity to adsorb phthalates via hydrogen bonds.

(2) The implementations related to the hydrophilic magnetic resins with high specific surface areas. The magnetic particles can easily be separated effectively in water such as to greatly enhance the scope of application of the resins during solid phase extraction processes of in water samples.

(3) The implementations relate to a method using the hydrophilic magnetic resins with high specific surface areas and a new type of magnetic solid phase extraction rod. An electromagnet is used such as to control collection and separation processes associated with the resins. The method is easy to operate and greatly improves the extraction efficiency.

(4) The implementations relate to applications of the hydrophilic magnetic resins with high specific surface areas. The applications include a method for fast extraction of phthalates using hydrophilic magnetic resins with high specific surface areas. The implementations establish a rapid and efficient extraction method based on magnetic solid phase extraction to extract trace amounts of phthalates.

(5) The implementations relate to a method for extraction of phthalates using hydrophilic magnetic resins with high specific surface areas without filling extraction materials into extraction columns. This greatly reduces the cost of materials, and provides fast and efficient solid phase extractions of a large volume of trace amounts of substances. Operations are simple and easy to be followed. The method solves problems such as high costs and time-consuming under conventional techniques.

(6) The implementations relate to a method for extraction of phthalates using hydrophilic magnetic resins with high specific surface areas. Magnetic solid phase extraction can greatly improve enrichment factors of trace organic compounds in water. Therefore, when extracting phthalates from water samples, magnetic solid phase extraction and liquid chromatography may be combined to detect and analyze trace amounts of phthalates.

Figure 1:
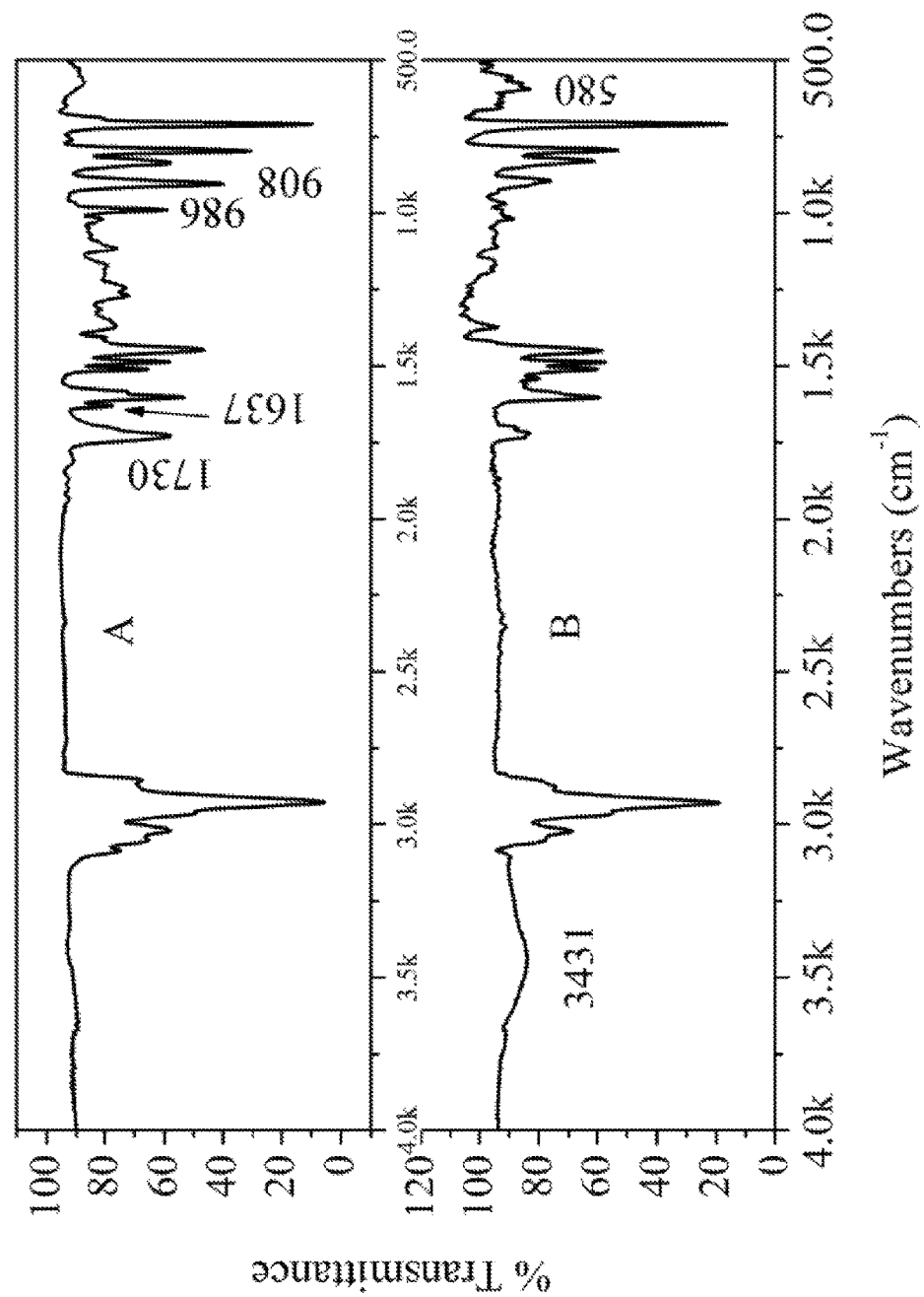
FIG. 1 is an infrared spectrum (FTIR) illustrating magnetic white balls and hydrophilic magnetic resins with high specific surface areas.

As used the FIGs above, number "1" refers to wire, number "2" refers to a plastic handle, number "3" refers to a sleeve, a number "4" refers to a switch, and number "5" refers to an electromagnet.

DETAILED DESCRIPTION

Below in conjunction with the accompanying drawings of the present invention is further illustrated.

A method of preparing a hydrophilic high specific surface area of the magnetic resin, may include the following operations.

(a) Providing a water phase by adding 0.5 to 2% by weight of gelatin and 5 to 20% by weight of salt to the water phase.

(b) Providing an oil phase by mixing monomer reactants and toluene as a porogenic agent, adding benzoyl peroxide as an initiator, and uniformly mixing thereof. The monomer reactants include divinyl benzene, vinyl benzoate and glycidyl methacrylate, a weight ratio between an amount of vinyl benzoate and an amount of divinyl benzene is about 1:0.5 to 2, a weight ratio between an amount of Methyl acrylate ester and the amount of divinylbenzene is about 1:1 to 9. A weight ratio between an amount of the toluene and an amount of the monomer reactants is about 1 to 2:1, and a weight of Benzoyl peroxide is about 0.5 to 3% of a total weight of monomer reactants and the porogenic agent.

(c) Adding magnetic particles wrapped and modified by oleic acid to the oil phase, uniformly mixing thereof, adding the oil phase into the water phase, obtaining magnetic white balls after a cooling process, a filtering process, a washing process, and a drying process. In these instances, a weight ratio between an amount of the water phase and an amount of the oil phase is about 2.5 to 9.5:1, a stirring speed is about 100 to 400 rpm, a temperature is control at about 60 to 80° C. for 3 to 6 hours and at about 80 to 90° C. for 5 to 8 hours. The magnetic particles in step (c) may include $Fe_3O_4$, $\gamma$-$Fe_2O_3$, and stainless steel powder. A weight of the magnetic particles is about 5 to 25% of a weight of monomer reactants.

(d) Swelling the magnetic white balls in dichloroethane for about 6 to 9 hours, adding 20 to 60% weight of anhydrous ferric chloride as a catalyst with respect to a weight of the magnetic white balls, raising the temperature to 80° C., and keeping the temperature for about 9 to 12 hours to obtain resins;

(e) Washing and drying the resins obtained in step (d), dipping the resins into an aqueous sodium hydroxide solution, separating the resins using centrifuge after cooling, washing the resins using water, and drying the resins to obtain the hydrophilic magnetic resins with high specific surface areas. A weight of the sodium hydroxide solution used in step (e) is 1 to 8 times of a weight of crosslinking magnetic resins, a concentration of the aqueous sodium hydroxide solution is about 5%, and a reaction temperature is about 60 to 70° C., a reaction time is about 5 hours.

Extraction of phthalates may be implemented using hydrophilic magnetic resins with high specific surface areas prepared as described above.

Figure 2:
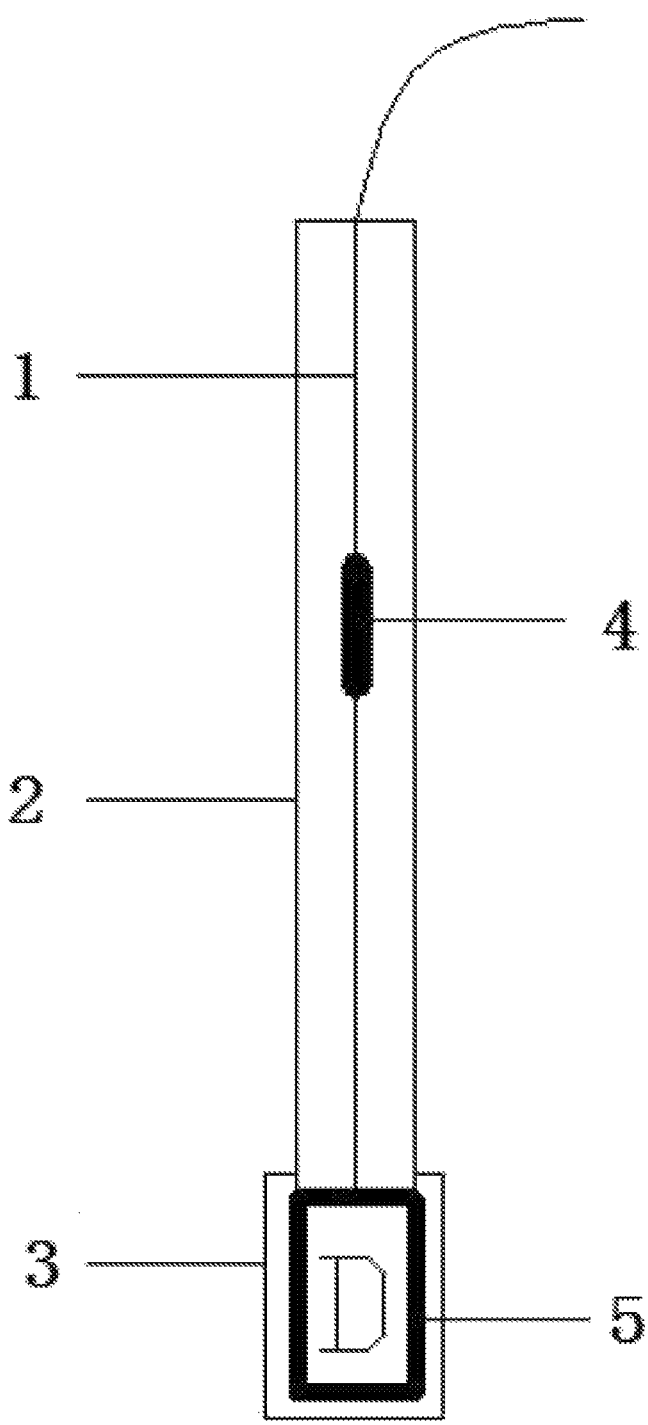
FIG. 2 is a schematic diagram illustrating a magnetic bar for solid phase extraction in accordance with implementations herein.
Figure 3:
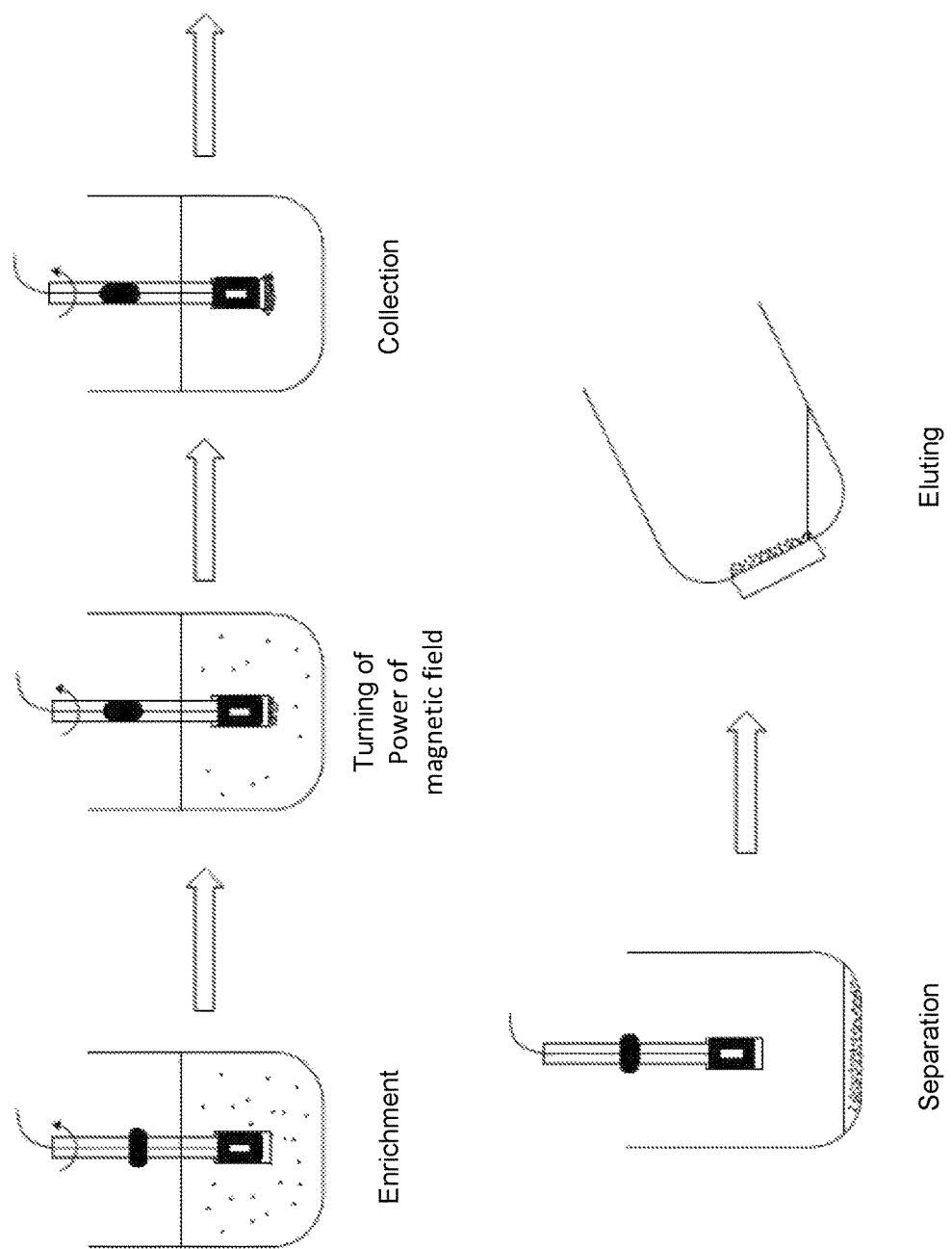
FIG. 3 is a schematic flow chart illustrating an example process for magnetic solid phase extraction.

A method for extraction of phthalates using hydrophilic magnetic resins with high specific surface areas, (1) Enrichment. Dispersing the hydrophilic magnetic resins with high specific surface areas prepared using the method described above to an environmental water sample, stirring the environmental water sample at a room temperature for about 10 to 60 min, applying a magnetic field to the environmental water sample, and separating extraction materials from the environmental water sample using the magnetic field. The stirring the environmental water sample may include stirring the environmental water sample using a magnetic stirring bar associated with solid phase extraction. In these instances, a weight of the environment water sample is about 500 to 5000 times of a weight of the hydrophilic magnetic resins with high specific surface areas. The magnetic stirring bar associated with solid phase extraction may include wire 1, a plastic handle 2, a casing 3, a switch 4 and an electromagnet 5. As illustrated in FIG. 2, the casing 3 is located on an end of the plastic handle 2, the plastic switch 4 is located in the plastic handle 2, the electromagnet 5 is located in the casing 3, and the wire 1 is connected the switch 4 and then the casing 3.

(2) Rinsing and then drying the extraction materials, placing the magnetic material generated in step (1) into eluent and washing away impurities, and drying the extraction materials. In these instances, the eluent used in step (2) may include a solution including methanol and water with a volume concentration of 1 to 10%, and a volume of the solution is about 1% of a volume of the environmental water sample.

(3) Eluting. Mixing the dried extraction materials with ethyl acetate for about 5 to 10 min, separating the extraction materials from the elution solvent using the magnetic field, and obtaining supernatant and place the supernatant through 0.22 μm membrane to for analysis. In these instances, a weight ratio between a weight of ethyl acetate and a weight of the hydrophilic magnetic resins with high specific surface areas being 5 to 25.

(4) Detection and analysis. Performing detection and analysis on the elution solvent using HPLC. A condition associated with the detection and analysis on the elution solvent using the HPLC is provided below: C18 column, namely 4.6×250 mm, 5 μm, mobile phase flow rate of 1 mL/min, column temperature 30° C., detection wavelength 220 nm; mobile phase of acetonitrile-water, and gradient acetonitrile phase is: 0 to 8 min, 60 to 80%; 8 to 15 min, 80 to 90%; 15 to 16 min, 90 to 100%; 16 to 27 min, 100%; 27 to 30min, 60%.

The examples are further provided below. The examples include methods for extracting six type of phthalates including dimethyl phthalate (DMP), diethyl phthalate (DEP), butyl benzyl phthalate (BBP), dibutylphthalate (DBP), dibutyl phthalate (2-ethylhexyl) (DNOP), and dioctyl fat (DEHP). In the following examples abbreviations are used for uniform representation.

EXAMPLE 1

5.0 g of gelatin and 100.0 g of salt were used for preparation of water phase 500 g. Oil phase included of 21.0 g of divinylbenzene, 11.7 g vinyl benzoate, 2.3 g of glycidyl methacrylate, 35.0 g of toluene, and 1.4 g of benzoyl peroxide. The oil phase and 8.75 g $Fe_3O_4$ wrapped by oleic acid are mixed, and added to the three-necked flask phase (175 g) to be mixed with the water phase. The stirring speed was controlled at 300 rpm, the reaction temperature was raised to 60° C. 6 h, and then incubated at 85° C. for 6 h. The resulting resin white balls (45.2 g) were washed with ethanol and water, and then was dried. The dried resin white balls were swollen in dichloroethane for about 6 hours, and added 22.6 g of anhydrous ferric chloride, and incubated at 12 h at 80° C. to obtain highly crosslinked resins. The highly crosslinked balls/resins (43.5 g) were added to 261 g 5% sodium hydroxide solution for reaction about 5 hours at 60° C. After cooling, the resins were separated using centrifuge and washed using ethanol-pure water to obtain hydrophilic magnetic resins with high specific surface areas. As illustrated in FIG. 1, in the spectrum of magnetic white balls, 1637 cm-1 986 cm-1 and an absorption peak indicated the C=C group, 908 cm-1 absorption peak indicated a glycidyl methacrylate of epoxy groups, 1730 cm-1 absorption peak indicated an ester group. Appearance of the three groups indicated that the suspension polymerization was carried out successfully. In the spectrum of the hydrophilic magnetic resins with high specific surface areas, 1637 cm-1 and 986 cm-1 absorption peak almost disappeared, indicating pendant vinyl (C=C) successfully carried out after the cross-linking reaction. Absorption peak at 3431 cm-1 was hydroxy peak from the hydrolysis of the ester group, and 908 cm-1 and 1730 cm-1 absorption peak appeared weakened, also proving successful hydrolysis reaction. The absorption peak at 580 cm-1 in FIG. 1 was a Fe—O bond, indicating the presence of the magnetic particles in the resin.

0.5 g of hydrophilic magnetic resins with high specific surface areas were added in 1000 mL water samples containing phthalate esters, and stirred at room temperature 60 min. Power of the magnetic solid phase extraction rod was turned on to collect magnetic resins. The resins were washed using 10 mL 5% methanol-water and dried using nitrogen. The dried resins were mixed with 5 g ethyl acetate phthalates for 5 min, and the extraction materials were separated from the elution solvent using the magnetic field. The elution was dried using nitrogen and mixed with 1 ML methanol. Detection and analysis were performed on the elution solvent using HPLC after running through 0.22 μm membrane. A condition associated with the detection and analysis on the elution solvent using the HPLC is provided below: C18 column, namely 4.6×250 mm, 5 μm, mobile phase flow rate of 1 mL/min, column temperature 30° C., detection wavelength 220 nm; mobile phase of acetonitrile-water, and gradient acetonitrile phase is: 0 to 8 min, 60 to 80%; 8 to 15 min, 80 to 90%; 15 to 16 min, 90 to 100%; 16 to 27 min, 100%; 27 to 30min, 60%.

Figure 4:
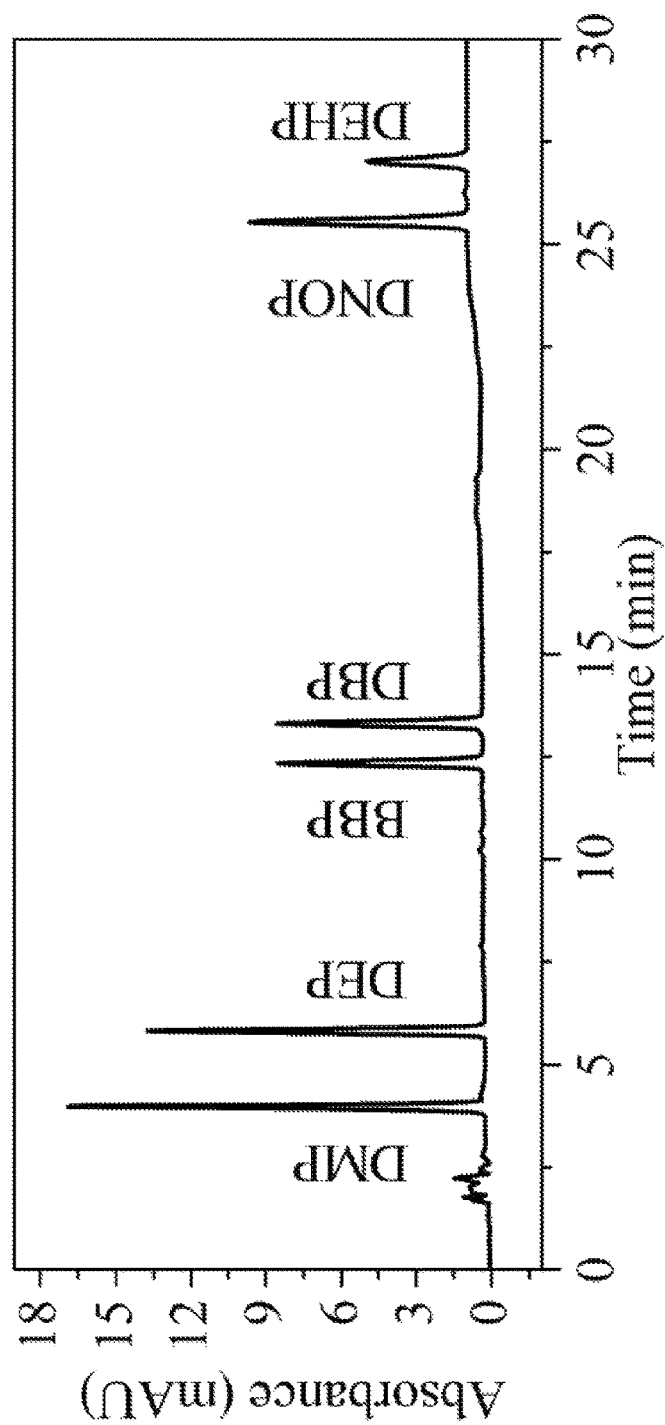
FIG. 4 is a schematic diagram showing liquid phase spectra associated with fast extraction of phthalates using hydrophilic magnetic resins with high specific surface areas.

As illustrated in FIG. 4, six substances can be well separated, and each phase spectrum of substances has a sharp symmetrical and high response. This indicates the method described herein may be used for a rapid and efficient extraction of phthalates. Enrichment recovery of each substance are provided in the table below.

| Target | DMP | DEP | BBP | DBP | DNOP | DEHP |
| --- | --- | --- | --- | --- | --- | --- |
| Recovery rate % | 93.5 | 96.8 | 93.5 | 98.3 | 94.1 | 92.5 |

EXAMPLE 2

5.0 g of gelatin and 100.0 g of salt were used for preparation of water phase 1000 g. Oil phase included of 10.0 g of divinylbenzene, 20.0 g vinyl benzoate, 3.3 g of glycidyl methacrylate, 40.0 g of toluene, and 2.7 g of benzoyl peroxide. The oil phase and 2.7 g $\gamma$-$Fe_2O_3$ wrapped by oleic acid are mixed, and added to the three-necked flask phase (696.4 g) to be mixed with water phase. The stirring speed was controlled at 400 rpm, the reaction temperature was raised to 80° C. 3 h, and then incubated at 90° C. for 5 h. The resulting resin white balls (31.5 g) were washed with ethanol and water, and then was dried. The dried resin white balls were swollen in dichloroethane for about 9 hours, and added 6.3 g of anhydrous ferric chloride, and incubated at 9 hours at 80° C. to obtain highly crosslinked resins. The highly crosslinked balls/resins (30.2 g) were added to 241.6 g 5% sodium hydroxide solution for reaction about 5 hours at 70° C. After cooling, the resins were separated using centrifuge and washed using ethanol-pure water to obtain hydrophilic magnetic resins with high specific surface areas.

0.2 g of hydrophilic magnetic resins with high specific surface areas were added in 100 mL water samples containing phthalate esters, and stirred at room temperature for 50 min. Power of the magnetic solid phase extraction rod was turned on to collect magnetic resins. The resins were washed using 1 mL 10% methanol-water and dried using nitrogen. The dried resins were mixed with 1 g ethyl acetate phthalate for 10 min, and the extraction materials were separated from the elution solvent using the magnetic field. The elution was dried using nitrogen and mixed with 1 mL methanol. Detection and analysis were performed on the elution solvent using HPLC after running through 0.22 μm membrane. Detection and analysis are similar to Example 1.

Enrichment recovery of each substance are provided in the table below.

| Target | DMP | DEP | BBP | DBP | DNOP | DEHP |
| --- | --- | --- | --- | --- | --- | --- |
| Recovery | 91.5 | 87.3 | 92.5 | 94.4 | 86.7 | 89.8 |

EXAMPLE 3

10.0 g of gelatin and 25.0 g of salt are used for preparation of water phase 500 g. Oil phase included of 12.0 g of divinylbenzene, 6.0 g vinyl benzoate, 12 g of glycidyl methacrylate, 60.0 g of toluene, and 0.45 g of benzoyl peroxide. The oil phase and 1.5 g stainless steel powder wrapped by oleic acid are mixed and added to the three-necked flask phase (360 g) to be mixed with water phase. The stirring speed was controlled at 100 rpm, the reaction temperature was raised to 75° C. 5 h, and then incubated at 80° C. for 8 h. The resulting resin white balls (30.6 g) were washed with ethanol and water, and then was dried. The dried resin white balls were swollen in dichloroethane for about 8 hours, and added 12.5 g of anhydrous ferric chloride, and incubated at 11 hours at 80° C. to obtain highly crosslinked resins. The highly crosslinked balls/resins (30.1 g) were added to 261 g 5% sodium hydroxide solution for reaction about 5 hours at 65° C. After cooling, the resins were separated using centrifuge and washed using ethanol-pure water to obtain hydrophilic magnetic resins with high specific surface areas.

0.4 g of hydrophilic magnetic resins with high specific surface areas were added in 500 mL water samples containing phthalate esters and stirred at room temperature for 10 min. Power of the magnetic solid phase extraction rod was turned on to collect magnetic resins. The resins were washed using 5 mL 1% methanol-water and dried using nitrogen. The dried resins were mixed with about 10 g ethyl acetate phthalate for about 8 min, and the extraction materials were separated from the elution solvent using the magnetic field. The elution was dried using nitrogen and mixed with 1 mL methanol. Detection and analysis were performed on the elution solvent using HPLC after running through 0.22 μm membrane. Detection and analysis are similar to Example 1.

Enrichment recovery of each substance are provided in the table below.

| Target substance | DMP | DEP | BBP | DBP | DNOP | DEHP |
| --- | --- | --- | --- | --- | --- | --- |
| Recovery rate % | 81.3 | 82.7 | 70.1 | 86.6 | 80.6 | 81.6 |

EXAMPLE 4

10.0 g of gelatin and 50.0 g of salt were used for preparation of water phase 500 g. Oil phase included of 15.0 g of divinylbenzene, 10.0 g vinyl benzoate, 5.0 g of glycidyl methacrylate, 50.0 g of toluene, and 0.8 g of benzoyl peroxide. The oil phase and 6.0 g Fe3O4 wrapped by oleic acid are mixed and added to the three-necked flask phase (400 g) to be mixed with water phase. The stirring speed was controlled at 250 rpm, the reaction temperature was raised to 78° C. 5 h, and then incubated at 80° C. for 7 h. The resulting resin white balls (32.0 g) were washed with ethanol and water, and then was dried. The dried resin white balls were swollen in dichloroethane for about 8 hours, and added 19.2 g of anhydrous ferric chloride, and incubated at 9 h at 80° C. to obtain highly crosslinked resins. The highly crosslinked balls/resins (30.4 g) were added to 152 g 5% sodium hydroxide solution for reaction about 5 hours at 65° C. After cooling, the resins were separated using centrifuge and washed using ethanol-pure water to obtain hydrophilic magnetic resins with high specific surface areas.

0.2 g of hydrophilic magnetic resins with high specific surface areas were added in 1000 mL water samples containing phthalate esters, and stirred at room temperature for 25 min. Power of the magnetic solid phase extraction rod was turned on to collect magnetic resins. The resins were washed using 10 mL 6% methanol-water and dried using nitrogen. The dried resins were mixed with about 4 g ethyl acetate phthalate for about 8 min, and the extraction materials were separated from the elution solvent using the magnetic field. The elution was dried using nitrogen and mixed with 1 mL methanol. Detection and analysis were performed on the elution solvent using HPLC after running through 0.22 μm membrane. Detection and analysis are similar to Example 1.

Enrichment recovery of each substance are provided in the table below.

| Target substance | DMP | DEP | BBP | DBP | DNOP | DEHP |
|---|---|---|---|---|---|---|
| Recovery rate % | 83.6 | 87.4 | 89.1 | 91.5 | 92.2 | 88.7 |

What is claimed is:

1. A method for preparation of hydrophilic, magnetic resins with high specific surface areas, the method comprising:
   (a) providing a water phase by adding 0.5 to 2% by weight of gelatin and 5 to 20% by weight of salt;
   (b) providing an oil phase by mixing monomer reactants and toluene as a porogenic agent, adding benzoyl peroxide as an initiator, and uniformly mixing thereof;
   (c) adding magnetic particles wrapped and modified by oleic acid to the oil phase, uniformly mixing thereof, adding the oil phase into the water phase, stirring the oil phase and the water phase mixture at a speed within about 100 to 400 rpm, while controlling temperature first at about 60 to 80° C. for 3 to 6 hour and subsequently at about 80 to 90° C. for 5 to 8 hours; and obtaining magnetic white balls after a cooling process, a filtering process, a washing process, and a drying process, wherein a weight ratio between an amount of the water phase and an amount of the oil phase is about 2.5 to 9.5:1;
   (d) swelling the magnetic white balls in dichloroethane for about 6 to 9 hours, adding 20 to 60% weight of anhydrous ferric chloride as a catalyst with respect to a weight of the magnetic white balls, raising the temperature to 80° C., and keeping the temperature at 80° C. for about 9 to 12 hours to obtain resins; and
   (e) washing and drying the resins obtained in step (d), dipping the resins into an aqueous sodium hydroxide solution, separating the resins using a centrifuge after another cooling process, washing the resins using water, and drying the resins to obtain the hydrophilic, magnetic resins with high specific surface areas.

2. The method of claim 1, wherein the monomer reactants in step (b) include divinyl benzene, vinyl benzoate and glycidyl methacrylate, and a weight ratio between an amount of vinyl benzoate and an amount of divinyl benzene is about 1:0.5 to 2 and a weight ratio between an amount of Methyl acrylate ester and the amount of divinyl benzene is about 1:1 to 9.

3. The method of claim 1, wherein a weight ratio between an amount of the toluene and an amount of the monomer reactants is about 1 to 2:1, and wherein a weight of Benzoyl peroxide is about 0.5 to 3% of a total weight of monomer reactants and the porogenic agent.

4. The method of claim 1, wherein the magnetic particles in step (c) include $Fe_3O_4$, $\gamma$-$Fe_2O_3$, and stainless steel powder, and wherein a weight of the magnetic particles is about 5 to 25% of a weight of monomer reactants.

5. The method of claim 4, wherein a weight of the sodium hydroxide solution used in step (e) is 1 to 8 times of a weight of crosslinking magnetic resins, and wherein a concentration of the aqueous sodium hydroxide solution is about 5%, a reaction temperature is about 60 to 70° C., and a reaction time is about 5 hours.

6. A hydrophilic magnetic resin with a high specific surface area comprise a hydrophilic magnetic resin prepared using the method of claim 1.

7. A method for extraction of phthalate comprising extracting the phthalate using hydrophilic magnetic resins with high specific surface areas prepared using the method of claim 1 from a water body.

8. A method for extraction of phthalate using hydrophilic magnetic resins with high specific surface areas, the method comprising:
   (1) dispersing the hydrophilic magnetic resins with high specific surface areas of claim 6 to an environmental water sample, a weight of the environment water sample is about 500 to 5000 times of a weight of the hydrophilic magnetic resins with high specific surface areas, stirring the environmental water sample at a room temperature for about 10 to 60 min, applying a magnetic field to the environmental water sample, and separating magnetic extraction materials from the environmental water sample using the magnetic field;
   (2) placing the magnetic extraction materials generated in step (1) into eluent, washing away impurities, and drying the magnetic extraction materials;
   (3) mixing the dried magnetic extraction materials with ethyl acetate for about 5 to 10 min, a weight ratio between a weight of ethyl acetate and a weight of the hydrophilic magnetic resins with high specific surface areas being 5 to 25, separating the magnetic extraction materials from an elution solvent using the magnetic field, and obtaining supernatant and place the supernatant through 0.22 μm membrane to for analysis; and
   (4) performing detection and analysis on the elution solvent using HPLC.

9. The method of claim 8, wherein the stirring the environmental water sample comprises stirring the environmental water sample using a magnetic stirring bar associated with solid phase extraction.

10. The method of claim 8, wherein the eluent used in step (2) is a solution including methanol and water with a volume concentration of 1 to 1.0%, and wherein a volume of the solution is about 1% of a volume of the environmental water sample.

* * * * *